(12) United States Patent
Wu

(10) Patent No.: US 8,506,177 B2
(45) Date of Patent: Aug. 13, 2013

(54) CABLE ASSEMBLY WITH ELECRICAL AND OPTICAL TRANSMITTING

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 262 days.

(21) Appl. No.: 13/081,477

(22) Filed: Apr. 6, 2011

(65) Prior Publication Data
US 2011/0249948 A1    Oct. 13, 2011

(30) Foreign Application Priority Data
Apr. 7, 2010  (CN) .......................... 2010 1 0140836

(51) Int. Cl.
*G02B 6/36*    (2006.01)
(52) U.S. Cl.
USPC ........................................... 385/89

(58) Field of Classification Search
USPC ............................................. 385/89
See application file for complete search history.

(56) References Cited

U.S. PATENT DOCUMENTS
6,909,821 B2 *  6/2005  Ravasio et al. .................. 385/24

* cited by examiner

*Primary Examiner* — Ryan Lepisto
*Assistant Examiner* — Jerry Blevins
(74) *Attorney, Agent, or Firm* — Wei Te Chung; Ming Chieh Chang

(57) ABSTRACT

An cable assembly (100) includes an insulative housing (1); a plurality of terminals (212, 222) received in the insulative housing; a plurality of lenses (81); a photoelectric conversion device (93); and a cable (6) including first fibers (63) and second fibers (65), the first fibers connected to photoelectric conversion device which further connected to the terminals, the second fibers connected to the lenses, respectively.

19 Claims, 6 Drawing Sheets

CABLE ASSEMBLY WITH ELECRICAL AND OPTICAL TRANSMITTING

FIELD OF THE INVENTION

The present invention generally relates to a cable assembly, and more particularly to a cable assembly adapted for electrical and optical transmitting.

DESCRIPTION OF PRIOR ART

Nowadays, an electrical device has become lower profile and multi-functional, and a cable assembly for the electrical device is also capable of high-speed transmitting, and reliably connection and easily detachable with its counterpart.

Cable assemblies in accordance with USB, SATA, HDMI, SAS and Displayport protocol have been widely applied in different kinds of electronic devices. The aforementioned cable assemblies depend on metallic terminals and copper wires to achieve electrical signal transmitting. However, transmitting speed is limited via electrical signal transmitting. In other aspect, as transmitting speed increasing, a structure of the cable assembly becomes complex, and a total dimension of the cable assembly is increasing.

Hence, an improved cable assembly is highly desired to overcome the aforementioned problems.

SUMMARY OF THE INVENTION

Accordingly, an object of the present invention is to provide a lower profile cable assembly capable of transmitting both electrical signal and optical signal.

In order to achieve the object set forth, a cable assembly in accordance with the present invention comprises: an insulative housing; a plurality of terminals received in the insulative housing; a plurality of lenses; a photoelectric conversion device; and a cable including first fibers and second fibers, the first fibers connected to photoelectric conversion device which further connected to the terminals, the second fibers connected to the lenses, respectively.

Other objects, advantages and novel features of the invention will become more apparent from the following detailed description when taken in conjunction with the accompanying drawings.

DETAILED DESCRIPTION OF PREFERRED EMBODIMENTS

Figure 1:
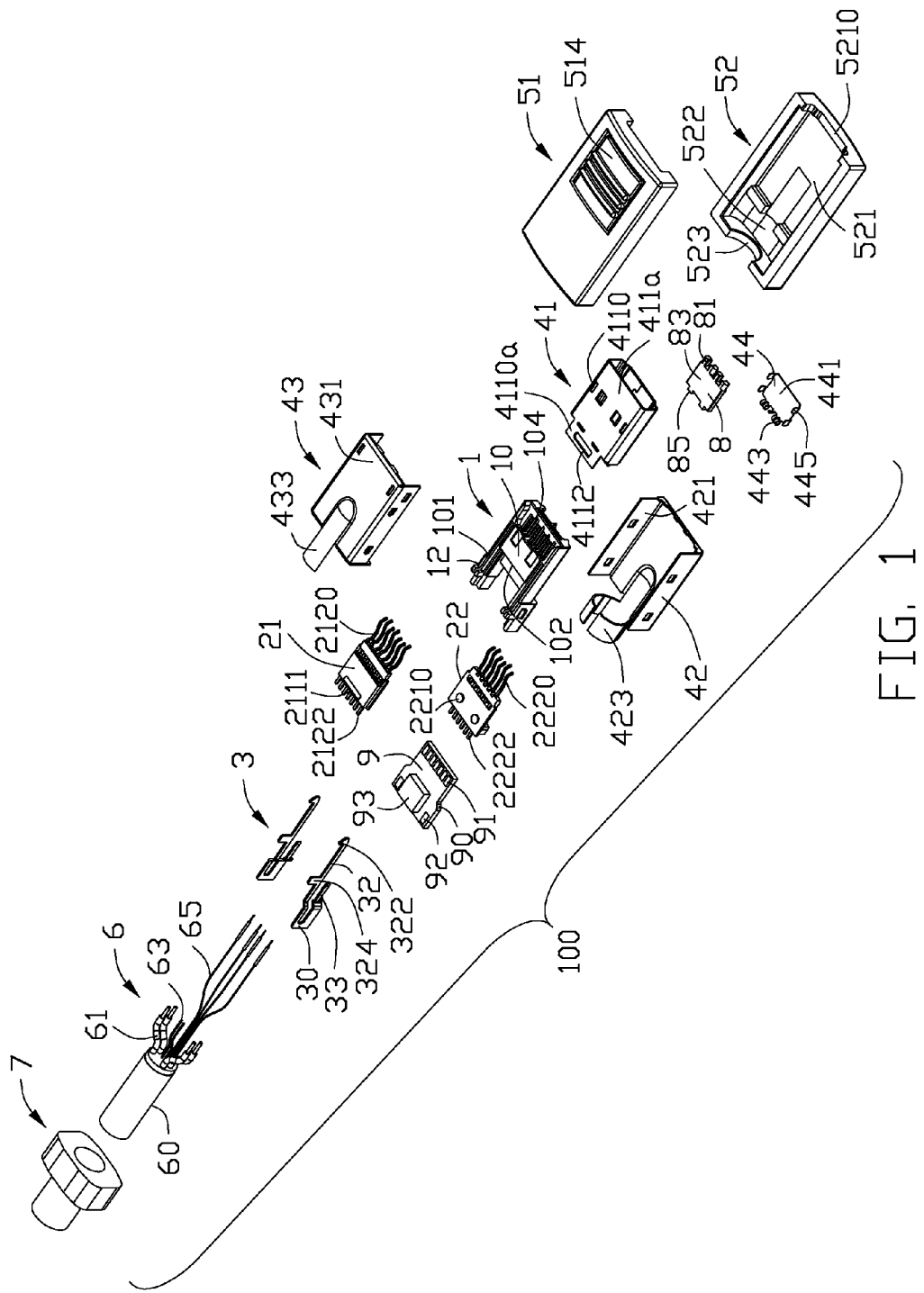
FIG. 1 is an exploded, perspective view of a cable assembly in accordance with the present invention.
Figure 2:
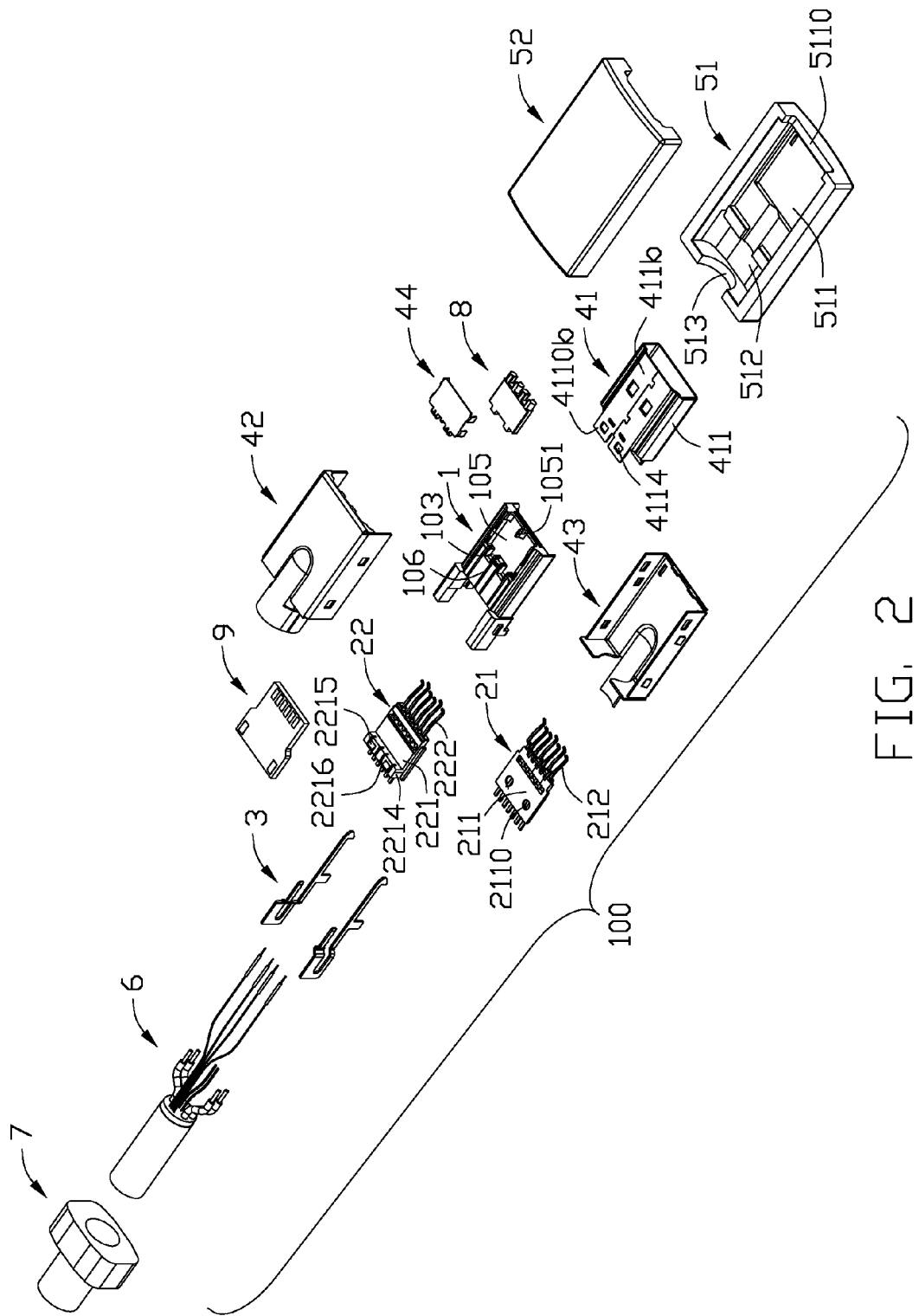
FIG. 2 is similar to FIG. 1, but viewed from another aspect.

Reference will now be made in detail to the preferred embodiment of the present invention.

Referring to FIGS. 1-6, a cable assembly 1000 in accordance with the present invention comprises an insulative housing 1, a terminal module 2, two latching members 3, a metallic shell 4, an external cover 5, a cable 6, a strain relief 7, an optical module 8 and a printed circuit board assembly (PCBA) 9.

The insulative housing 1 includes a main portion 10 and two mounting arms 12 extending rearwardly from lateral sides of the main portion 10. There is a longitudinal slot 101 is defined in a lateral side and a corresponding mounting arm 12. A receiving space 102 is recessed forwardly from a middle segment of a rear edge of the main portion 10. A cavity 104 is recessed downwardly from a front segment of an upper side of the main portion 10 and further communicates with the receiving space 102. A depression 105 is defined in a front section of a lower side of the main portion 10. In addition, there is a stopping portion 1051 disposed in a middle segment of the depression 105. Two positioning slots 103 are located in a back section of the lower side of the main portion 10. The two positioning slots 103 spaced apart from each other along a transversal direction. Four grooves 106 are defined in the back section of the lower side of the main portion 10, and there are two grooves 106 disposed between the two guiding slots 103 and the other two grooves 106 respectively located at outside of the two positioning slots 103.

The terminal module 2 includes a first terminal module 21 and a second terminal module 22. The first terminal module 21 has an insulator 211 and a number of terminals 212 combined together by insert-molding process. The terminals 212 are divided into signal terminals and grounding terminals configured to be longer than the signal terminals. The terminals 212 have contacting portions 2120 disposed in front of an edge of the insulator 211 and tail portions 2112 disposed behind the insulator 211. Two mounting holes 2110 are defined in a bottom side of the insulator 211 and a protruding portion 2111 are formed on a top side of the insulator 211.

The second terminal module 22 has an insulator 221 and a number of terminals 222 combined together by insert-molding process. The terminals 222 are divided into signal terminals and grounding terminals configured to be longer than the signal terminals. The terminals 222 have contacting portions 2220 disposed in front of an edge of the insulator 221 and tail portions 2222 disposed behind the insulator 221. Two mounting posts 2210 are formed on a top side of the insulator 221. There is transversal flange 2214 formed on a bottom side of a back segment of the insulator 221. In addition, there are four passages 2216 defined in the transversal flange 2214 and extending along a front-to-back direction. There are also two protruding tabs 2215 formed on the transversal flange 2214.

The first terminal module 21 and the second terminal module 22 are assembled together, with the contacting portions 2120, 2220 merged into one row, while the tail portions 2122, 2222 separated into two distinct rows along an up-to-down direction. The mounting posts 2210 are inserted into the mounting holes 2110 so as to keep the first terminal module 21 and the second terminal module 22 together. The first terminal module 21 and the second terminal module 22 are assembled to the insulative housing 1, with front segments of the insulators 211, 221 inserted into the receiving space 102, back segments of the insulators 211, 221 disposed between the two mounting arms 12, the contacting portions 2120, 2220 extending into the cavity 104.

Each latching member 3 includes a connecting arm 30, a latching arm 32 and a retention arm 33. The latching arm 32 and the retention arm 33 are spaced apart from each other and extend forwardly from the connecting arm 30. The latching arm 32 and the retention arm 33 are located in a first vertical plane. The connecting arm 30 is of U-shaped and locate in second vertical plane which is disposed outside the first vertical plane. A tab 324 is formed on a top side of the latching arm 32. The retention arm 33 is inserted into a positioning hole (not numbered) of the mounting arm 12, and the latching arm 32 is received in the slot 101 of the insulative housing 1. The connecting arm 30 is located behind the mounting arm 12 and adjacent to an outer surface of the mounting arm 12, therefore, more space is left between the two connecting arms 30.

The metallic shell 4 has a first shell 41, a second shell 42 and a third shell 43. The metallic shell 4 further includes a metallic cap 44. The first shell 41 includes a frame 411 to accommodate the main portion 10 therein. Two through holes 4110 are defined in a front segment of a top side 411a of the frame 411 to allow hooks 322 of the latching arm 32 passing through. A first engaging portion 4110a projects backward from the top side 411a. There is a positioning hole 4112 defined in the first engaging portion 4110a to latch with the protruding portion 2111 of the first terminal module 21. The frame 411 also has a bottom side 411b, with a second engaging portion 4110b projects backward therefrom. There are two positioning holes 4114 defined in the second engaging portion 4110b to latch with the protruding tabs 2215 of the second terminal module 22.

The second shell 42 includes a U-shaped main body 421 and a cable holder 423 integrated with the main body 421 and projecting backwardly. The third shell 43 includes an inverted U-shaped main portion 431 and a tail 433 extending rearward. The second shell 42 and the third shell 43 can be combined together along a vertical direction.

The metallic cap 44 has a planar body 441, two cylindrical shaped first retainers 443 formed at a back side of the planar body 441, and a plurality of second retainers 445 formed at opposite sides of the planar body 441.

The external cover 5 includes an upper cover 51 and a bottom cover 52. The upper cover 51 has a first hollow 511 and a second hollow 512 disposed behind the first hollow 511. A rectangular shaped opening 5110 is located in the front portion of the upper cover 51, and the opening 5110 further communicates with the first hollow 511. A semicircular shaped outlet 513 is defined in the rear portion of the upper cover 51 and communicated with the second hollow 512. A deformable button 514 is integrally formed with the upper cover 51 and floatable along up-to-down direction to enter the first hollow 511 so as to actuate the tab 324 of the latching arm 32.

The bottom cover 52 is similar to the upper cover 51, and also has a first hollow 521 and a second hollow 522 disposed behind the first hollow 521. An opening 5210 is located in the front portion of the bottom cover 52, and the opening 5210 further communicates with the first hollow 521. A semicircular shaped outlet 523 is defined in the rear portion of the bottom cover 52 and communicated with the second hollow 522.

The cable 6 includes a number of copper wires 61, first fibers 63, second fibers 65 and an insulative jacket 60 enclosing the copper wires 61, the first fibers 63 and the second fibers 65. The strain relief member 7 is molded over a front segment of the cable 6. In addition, the strain relief member 7 is held in the second hollows 512, 522.

The optical module 8 includes a number of lenses 81, a seat 83 for supporting the lenses 81 and two guiding members 85 extending backwardly from a back side of the seat. The lenses 81 are arranged in a row along a transversal direction and embedded in the seat 83. In addition, the lenses 81 extend beyond front side of the seat 83, with a gap formed front portions of every two adjacent lenses 81. The second fibers 65 are respectively coupled to the lenses 81.

The optical module 8 is assembled to the depression 105 of the insulative housing 1, with ends of the two guiding members 85 respectively received in the two positioning slots 103, and the seat 83 of the optical module 8 is also stopped by a stopping portion 1051. The metallic cap 44 is assembled to the insulative housing 1, with the planar body 441 mounted to and shielding the optical module 8, and the first retainers 443 accommodated in the positioning slots 103 and pressing against back edges of the guiding members 85. The second retainers 445 are sandwiched between lateral sides of the seat 83 and inner lateral sides of the depression 105. In addition, the metallic cap 44 is accommodated in frame 411, sandwiched between the insulative housing 1 and the bottom side 411b of the frame 411. Each second fiber 65 pass through a corresponding groove 106 and passage 2216, respectively.

The printed circuit board assembly (PCBA) 9 includes a substrate 90, a plurality of first conductive pads 91, second conductive pads 92 formed on front and back segments of the substrate 90. There is a photoelectric conversion device 93 mounted to the substrate 90.

The PCBA 9 is disposed behind the terminal module 2 and further sandwiched between the two mounting arms 12. In addition, a back segment of PCBA 9 is located between the two the two connecting arms 30. The terminal module 2 is electrically connected with the PCBA 9, with the tail portions 2122, 2222 electrically connected to the first conductive pads 91 arranged on top and bottom sides of the substrate 90. The copper wires 61 are electrically connected to the second conductive pads 92. The second fibers 63 are optically connected to the photoelectric conversion device 93. Therefore, an electrical transmitting line is formed between the copper wires 61, the second conductive pads 92, the corresponding first conductive pads 91 and the corresponding terminals 212, 222. A photoelectric transmitting line is formed between the first fibers 63, the photoelectric conversion device 93 and the other corresponding first conductive pads 91 and the other corresponding terminals 212, 222. A optical transmitting line is formed between the second fibers 65 and the lenses 81.

Figure 3:
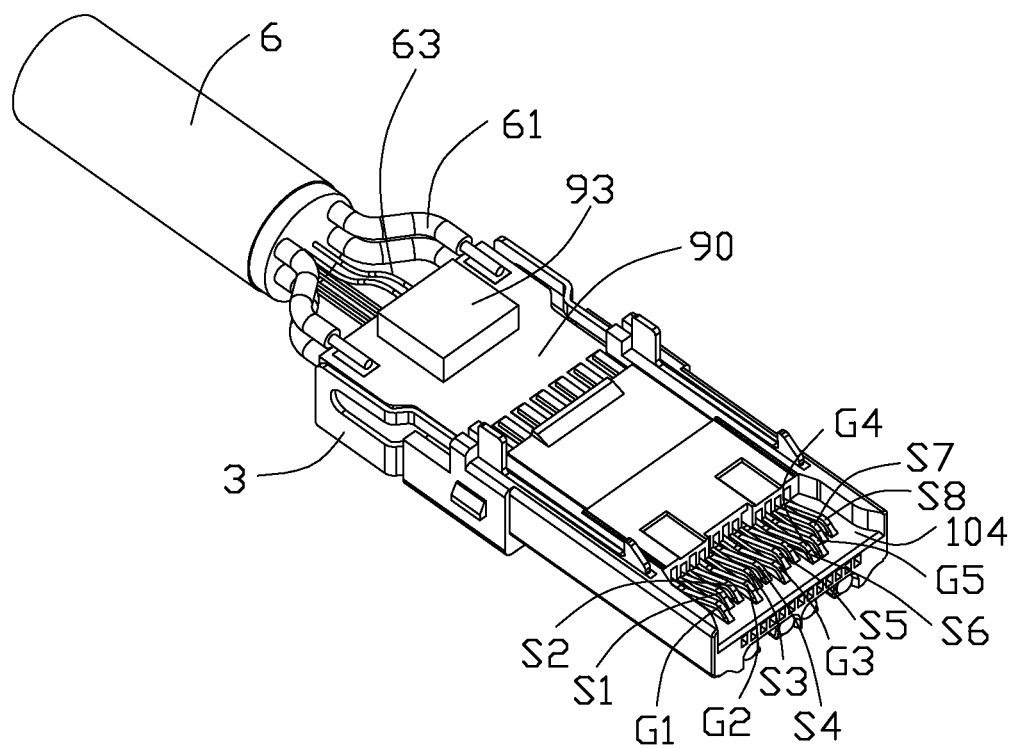
FIG. 3 is a partially assembled view of the cable assembly.
Figure 4:
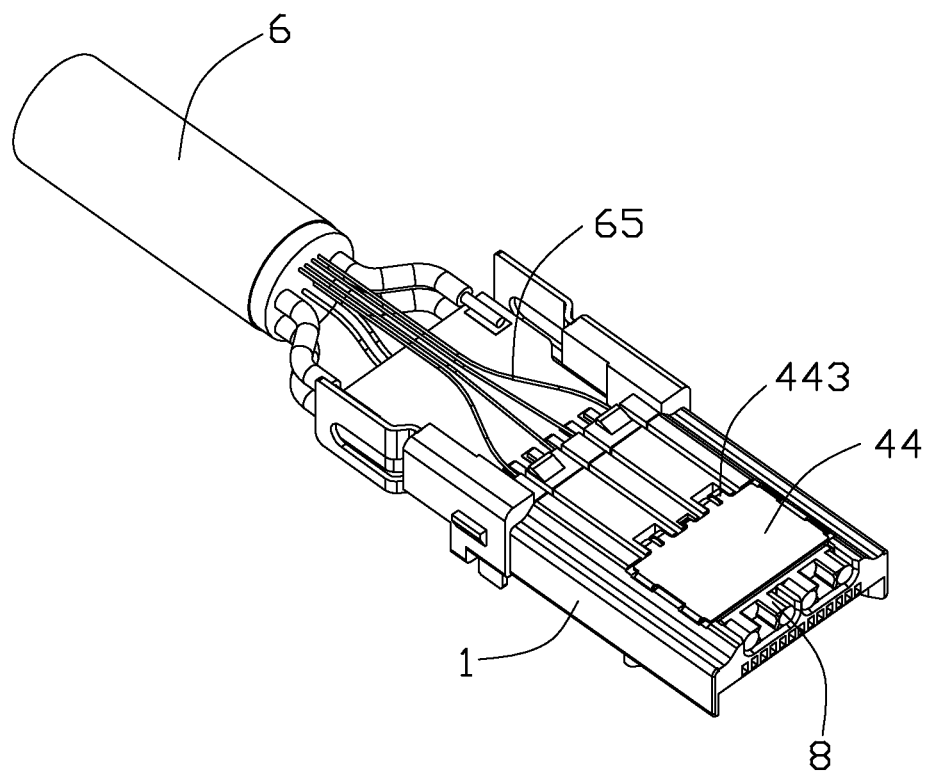
FIG. 4 is similar to FIG. 3, but viewed from other direction.
Figure 5:
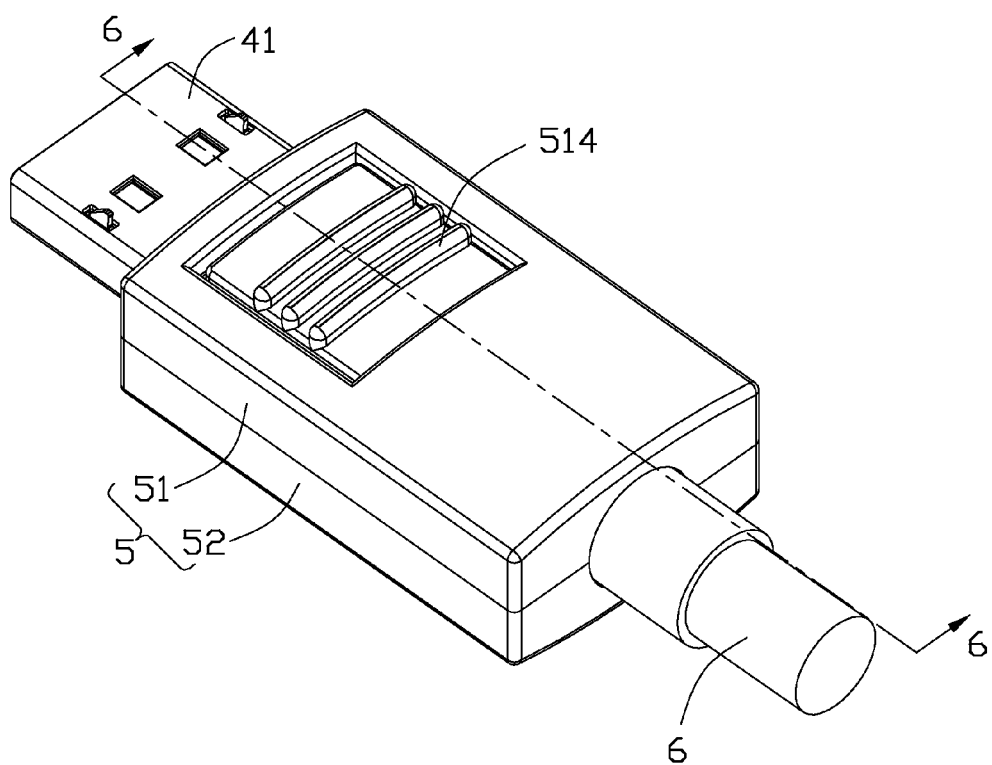
FIG. 5 is an assembled, perspective view of the cable assembly.
Figure 6:
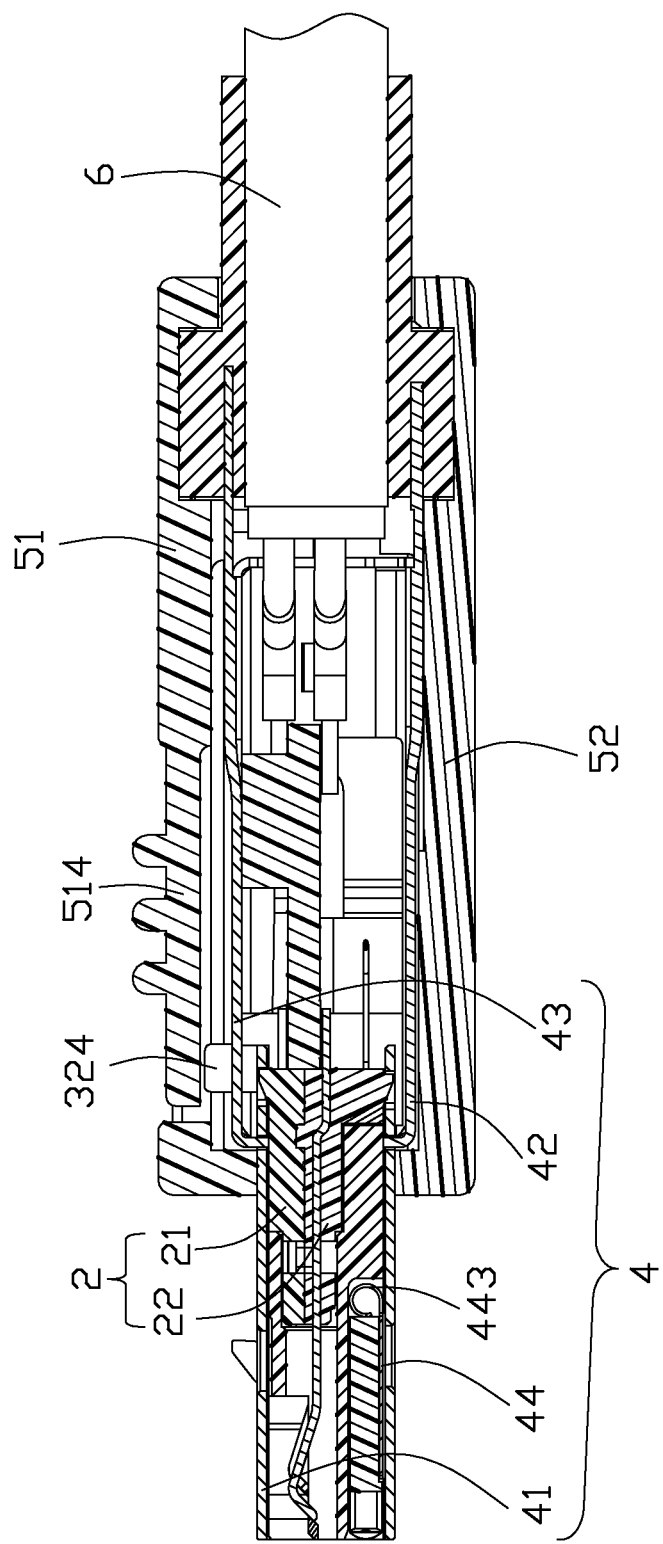
FIG. 6 is a cross-section view taken along line 6-6 of FIG. 5.

An arrangement of the terminals 212, 222 is in accordance with Digital Interactive Interface for Video & Audio (DiiVA) standard. Referring to FIG. 3, within the cavity 104, along a left-to-right direction, there are thirteen terminals which are arranged in such manner: G1-S1-S2-G2-S3-S4-G3-S5-S6-G4-G5-S7-S8. G represents grounding terminal, and S represent signal terminal. There are three differential pairs consisted of six signal terminals located between grounding terminals. The differential pairs for high-speed transmitting used for conveying video signals. And a pair of signal terminals disposed in the right side cavity 104 used for audio signals. The differential pairs of the terminals 212, 222 are electrically connected to the photoelectric conversion device 93.

When detach the cable assembly 100 from a complementary connector, just press the deformable button 514 to actuate the tab 324 of the latching arm 32, and the latching arm 32 retreat into the slots 101. When the pressing force is withdrawn, the deformable button 514 restored to its original position and the latching arms 32 also upwardly movement by rebounded force of the resilient tabs 304.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A cable assembly, comprising:
an insulative housing;
a plurality of terminals received in the insulative housing;
a plurality of lenses;
a photoelectric conversion device; and
a cable including first fibers and second fibers, the first fibers connected to photoelectric conversion device which further connected to the terminals, the second fibers connected to the lenses, respectively;
wherein the insulative housing defines a cavity on a top side thereof, and the terminals have contacting portions arranged in a row and extending into the cavity and tail portions separated into two rows along up-to-down direction.

2. The cable assembly as recited in claim 1, wherein the cable further has copper wires electrically connected to the corresponding terminals.

3. The cable assembly as recited in claim 2, wherein there is a substrate with first conductive pads and second conductive pads formed on a front segment and back segment thereof.

4. The cable assembly as recited in claim 3, wherein the photoelectric conversion device is mounted to the substrate.

5. The cable assembly as recited in claim 1, wherein the insulative housing further defines a depression on a bottom side thereof, and the lenses are accommodated in the depression.

6. A cable assembly, comprising:
an insulative housing;
at least one terminal module assembled to the insulative housing, the terminal module having a plurality of terminals combined with an insulator thereof;
a printed circuit board assembly having a substrate with a photoelectric conversion device mounted thereon; and
a cable including copper wires and fibers, the copper wires electrically connected to corresponding terminals via the substrate, and the fibers optically connected to the photoelectric conversion device which further electrically connected to corresponding terminals via the substrate.

7. The cable assembly as recited in claim 6, further comprising an optical module connected to the corresponding fibers.

8. The cable assembly as recited in claim 7, wherein the printed circuit board assembly is disposed behind the terminal module, and the terminals have tail portions separated into two rows respectively contacting to corresponding conductive pads formed on a top and bottom sides of a front segment of the substrate.

9. The cable assembly as recited in claim 8, wherein the insulative housing includes a main portion defines a receiving space recessed forwardly from a rear edge thereof and a cavity recessed downwardly from a front segment of an upper side of the main portion, and the receiving space communicates with the cavity.

10. The cable assembly as recited in claim 9, wherein the terminal module is assembled to the receiving space and contacting portions of the terminals are received in the cavity.

11. The cable assembly as recited in claim 9, wherein there are two mounting arms extending rearwardly from lateral sides of the main portion, and the printed circuit board assembly is sandwiched between the two mounting arms.

12. The cable assembly as recited in claim 11, wherein there are two latching members mounted to the two mounting arms, respectively.

13. The cable assembly as recited in claim 12, wherein each latching member includes a connecting arm, a latching arm and a retention arm, and the latching arm and the retention arm are spaced apart from each other and extend forwardly from the connecting arm.

14. The cable assembly as recited in claim 13, wherein the latching arm and the retention arm are located in a first vertical plane, and the connecting arm is of U-shaped and locate in second vertical plane which is disposed outside the first vertical plane.

15. The cable assembly as recited in claim 14, wherein a back segment of the printed circuit board assembly is located between the two connecting arms.

16. A cable connector assembly comprising:
an insulative housing defining a mating section including an electrical mating port and an optical mating port around a front face thereof;
a plurality of electrical contacts disposed in the housing with contacting sections exposed in the electrical mating port;
a plurality of lenses disposed in the housing and exposed in the optical mating port;
a printed circuit board (PCB) associated with the housing and being equipped with a plurality of conductive pads and a photoelectric conversion device thereon; and
a cable linked behind the housing and including a plurality of copper wires and a plurality of optical fibers; wherein
there are three different transmission lines formed between the mating section and the cable, an electrical transmission line between the contacts and the copper wires with assistance of the PCB, an optical transmission line between the lenses and the fibers without assistance of the PCB, and a photoelectric transmission line between the contacts and the fibers with assistance of the PCB.

17. The cable connector assembly as claimed in claim 16, wherein the contacting sections of the contacts are essentially arranged in one row while the conductive pads are arranged on two opposite faces the PCB.

18. The cable connector assembly as claimed in claim 16, wherein the photoelectric conversion device is located upon one face of the PCB while the fibers performing the optical transmission line extend on the other face of the PCB.

19. The cable connector assembly as claimed in claim 16, wherein the fibers are categorized with first and second groups respectively belonging to the optical transmission line and the photoelectric transmission line under condition that the fibers of the first group extend forward longer than those of the second group.

* * * * *